(12) United States Patent
Müller

(10) Patent No.: US 6,852,145 B2
(45) Date of Patent: Feb. 8, 2005

(54) METHOD, APPARATUS AND SYSTEM FOR THE CONDENSATION OF VAPORS AND GASES

(75) Inventor: Odd G. Müller, Risör (NO)

(73) Assignee: Ide Til Produkt AS, Sogne (NO)

( * ) Notice: Subject to any disclaimer, the term of this patent is extended or adjusted under 35 U.S.C. 154(b) by 13 days.

(21) Appl. No.: 10/168,504

(22) PCT Filed: Dec. 21, 2000

(86) PCT No.: PCT/NO00/00440

§ 371 (c)(1),
(2), (4) Date: Nov. 21, 2002

(87) PCT Pub. No.: WO01/48419

PCT Pub. Date: Jul. 5, 2001

(65) Prior Publication Data

US 2003/0101868 A1 Jun. 5, 2003

Related U.S. Application Data

(60) Provisional application No. 60/171,646, filed on Dec. 27, 1999.

(30) Foreign Application Priority Data

Dec. 23, 1999 (NO) ................................................ 996471

(51) Int. Cl.[7] .............................................. B01D 47/10
(52) U.S. Cl. ............................ 95/216; 96/275; 96/323; 261/76; 261/DIG. 54
(58) Field of Search .......................... 95/216, 217, 288; 96/275, 323, 266; 261/DIG. 54, 76; 62/50.7, 46.3, 50.1, 48.2; 220/750

(56) References Cited

U.S. PATENT DOCUMENTS

| | | | | |
|---|---|---|---|---|
| 615,914 A | * | 12/1898 | Schutte | 261/76 |
| 704,585 A | * | 7/1902 | Schutte | 261/76 |
| 922,260 A | * | 5/1909 | Clawson | 261/76 |
| 926,943 A | * | 7/1909 | Hogel | 261/146 |
| RE13,684 E | * | 2/1914 | Heslewood | 261/36.1 |
| 1,403,282 A | * | 1/1922 | Barclay | 261/76 |
| 2,723,001 A | * | 11/1955 | Hoff | 95/174 |
| 2,784,560 A | * | 3/1957 | Johnson, Jr. | 62/47.1 |
| 2,944,405 A | * | 7/1960 | Basore et al. | 62/48.2 |
| 3,003,325 A | | 10/1961 | Poethig et al. | |
| 3,302,418 A | * | 2/1967 | Walter | 62/50.2 |
| 3,369,371 A | | 2/1968 | Holly et al. | |
| 3,733,838 A | * | 5/1973 | Delahunty | 62/48.2 |
| 3,800,550 A | * | 4/1974 | Delahunty | 62/47.1 |
| 3,921,412 A | * | 11/1975 | Heath et al. | 62/48.2 |
| 3,947,258 A | * | 3/1976 | Decker | 95/229 |
| 3,956,903 A | | 5/1976 | Hiller et al. | |
| 3,981,156 A | * | 9/1976 | Modisette et al. | 62/48.2 |
| 4,401,444 A | * | 8/1983 | Teller | 95/200 |
| 4,422,301 A | * | 12/1983 | Watt et al. | 62/48.2 |
| 4,637,216 A | * | 1/1987 | Shenoy et al. | 62/47.1 |
| 5,897,690 A | * | 4/1999 | McGrew | 95/188 |
| 2003/0101868 A1 | * | 6/2003 | Muller | 95/216 |

FOREIGN PATENT DOCUMENTS

NO    305525    3/1997

* cited by examiner

*Primary Examiner*—Duane S. Smith
(74) *Attorney, Agent, or Firm*—Wenderoth, Lind & Ponack, L.L.P.

(57) ABSTRACT

A method for condensing fumes or gases from a tank containing a liquid. The method includes leading the liquid into a venturi to create a low pressure at the venturi. Ports are provided in the venturi at the area where the low pressure is created, and gas/vapor is lead to the ports in the venturi in the low pressure area in such a way that the liquid entrains the gas/vapor and forms a fluid, such that the velocity is reduced and the pressure increased to condense the gas/vapor. The fluid is then led from the chamber to a lower part of the tank for further condensation due to the hydrostatic pressure. An apparatus, a system and uses thereof are also described.

16 Claims, 4 Drawing Sheets

METHOD, APPARATUS AND SYSTEM FOR THE CONDENSATION OF VAPORS AND GASES

This application claims the benefit of Provisional 60/171,646 filed Dec. 27, 1999.

BACKGROUND OF THE INVENTION

1. Field of the Invention

The present invention is directed to a method, an apparatus and a system for the condensation of gases/fumes/vapors and particularly an apparatus for condensation of fumes during filling and storage of liquid fluids.

During storage and filling of fluids in tanks or vessels there is a problem that fumes or gases escapes from the handled or stored liquid. This is particularly prominent with volatile liquids and cooled, liquid gases. These gases or fumes have traditionally been allowed to escape into the atmosphere. This has lead to loss of fluid, pollution, and poor working conditions for people in the area. Examples of such liquids are crude oil, liquid natural gas (LNG) and other hydrocarbons.

Volatile liquids begin to produce fumes or gases during storage, and this creates a pressure build up in a tank where the liquid is stored. This pressure must be vented or bled off if it exceeds a certain value in order to avoid excessive loads on the tank where the liquid is stored.

Liquid will displace the gases or fumes contained in a tank during filling, and these gases must be vented or bled off to prevent pressure build up in the tank.

2. Description of Related Art

Various solutions to these problems have been previously suggested, and the solutions have comprised various complicated suction and condensation devices. Similar devices have particularly been used in connection with storage and transport of liquid gases. Examples are shown in the publications described below.

Norwegian Patent No. 305525 shows a "Method and gas Apparatus for Transport and Storage of Liquidized Natural Gas" Boil off is taken from a tank, and condensed in a condensation device with a cooler, and is led back into the tank. The device separates methane and nitrogen, and the nitrogen is vented into the atmosphere.

U.S. Pat. No. 2,784,560, shows a "Process and Apparatus for storage and shipping of Liquefied Gases" Boil off from the liquid gas is circulated in a device with a cooler, and is cooled by means of another liquid gas, to condensate the boil off and lead this back into the bottom of the tank.

U.S. Pat. No. 3,733,838 shows a "System for Reliquefying Boil Off Vapor from Liquefied Gas". The system comprises an insulated storage tank, a venturi, a pump, and a heat exchanger. The system is intended to be used in connection with storage of liquid gas. A part of the liquid gas is compressed, and is expanded in a heat exchanger to provide cooling. The storage tank is cooled by expansion of a partly condensed stream that is led into the part of the tank, containing vapor.

U.S. Pat. No. 3,921,412 shows a "Vapor Recovery Apparatus Employing a Dispensing Nozzle with Condensing Capacity". The nozzle is placed in a filler opening, and cools vapor/gas flowing out during filling, to condense the vapor, and let it drip back into the tank.

With the exception of this, the publications concern quite comprehensive systems for storage of cooled liquefied gas. None of these publications seeks to solve problems relating to shipping and storage of volatile liquids on a larger scale. In addition, various suction devices are known that suck the vapor/gas from a tank to be filled, condense the vapor/gas, and leads the condensate back to the tank the liquid comes from.

SUMMARY OF THE INVENTION

Accordingly, the present invention concerns a method for the condensation of vapors or gases from a tank containing a liquid. The method includes the steps of:

Leading a fluid into a venturi to create a low pressure by the venturi, providing ports in the venturi in the area with low pressure, leading vapor/gas to the ports in the venturi in such a way that the liquid entrains the vapor/gas to form a fluid, leading the fluid with vapor/gas into a chamber in such a way that the velocity is reduced, and the pressure increases for the condensation of the vapor/gas, and leading the fluid from the chamber to the lowermost part of the tank for further condensation due to the hydrostatic pressure.

Furthermore, the invention comprises an apparatus for the condensation of vapor or gas coming from one or several tanks for storage of liquid when filling or storing the liquid in the tank or tanks. The apparatus comprises a supply channel for the supply of liquid to the apparatus, and a housing for collecting and leading the gas/vapor to be condensed, a venturi with induction ports for entraining the vapor/gas into the liquid, a chamber for the condensation of the gas/vapor at a higher pressure, one or several gas induction ports for the transfer of the gas/vapor to the tank or tanks to the housing, and an outlet duct for transfer of liquid and gas/vapor to the tank/tanks, where the supply duct goes into the venturi with induction port that continues into the chamber, and then to the outlet duct that ends up in the tank or tanks, and where the housing encases the end of the supply duct, the venturi with induction ports, and the chamber, such that the transition between the supply duct and the housing is sealed, and that the gas induction port is connected to the tank are tanks and the housing, such that the housing or the tanks are in a in a gas stream communication.

Below is a point-by-point description of a suction-and-condensation unit for treating unwanted evaporation from volatile fluids. In this connection, volatile fluids means a fluid that comprises several fractions with different boiling point and vapor pressure, so that the evaporation occurs at the ambient pressures and temperatures, such as petrol, crude oil and condensate.

When storing volatile liquids, a pressure in the tank or tanks where the liquid is stored will be created. This pressure will, according to the invention, be reduced by pumping out liquid from the tank by means of a pump. The liquid is then led through a piping system or the like, to the condensation apparatus. Inside the condensation apparatus, the liquid goes into a venturi to create a lower pressure inside the venturi, compared to the ambient pressure in the tank. The venturi comprises one or several ports or openings where the above lower pressure is created. The venturi may comprise means for varying the venturi effect of the flow rate in order to optimize the parameters under all conditions. These means may incorporate a tapered piston that may serve as an adjustable nozzle or valve in the venturi. The condensation apparatus is in connection with the gas/vapor between the liquid surface and the top of the tank. The gas/vapor will thereby be able to pass from the space between the liquid surface and the top of the tank, and to the venturi device with ports in such a way that the vapor/gas is drawn through the ports or openings in the venturi device, and into the circulating liquid. The liquid, now containing gas/vapor bubbles or cavities then precedes into a chamber where the gas/vapor bubbles gets a reduced velocity, and thereby a higher pressure. This pressure, contributes to the condensing of the gas/vapor. This condensation may, if needed, be increased by means of a cooling element. From the chamber, the liquid is led in an outlet duct ending up at the bottom of the tank, where the hydrostatic pressure contributes to further condensation. Condensation of this kind is called "bubble condensation". The outlet duct may comprise one or several constrictions to control the pressures to achieve the best possible condensation. This constriction may, if desired, be variable. Possibly, other means, such as a proportional valve, can be used to control these pressures.

When filling the tank, the above mentioned pump will be stopped, and a valve, piping system will bypass the pump and let the liquid that is filled go through the condensation apparatus.

Alternatively, the tank or tanks may comprise one or several condensation—and circulation devices, and the filler devices comprise a separate condensation unit. The number and size of the condensation apparatuses, will depend of the necessary capacity, that furthermore will depend on the size and shape of the tanks, the climate when the tank/tanks are situated, the nature of the fluid to be stored, how long the fluid is to be stored, flow rate when filling, etc.

BRIEF DESCRIPTION OF THE DRAWINGS

Below is a short description of the figures.

DETAILED DESCRIPTION OF THE INVENTION

Below is a description of an embodiment of the invention with reference to the drawings.

Figure 1:
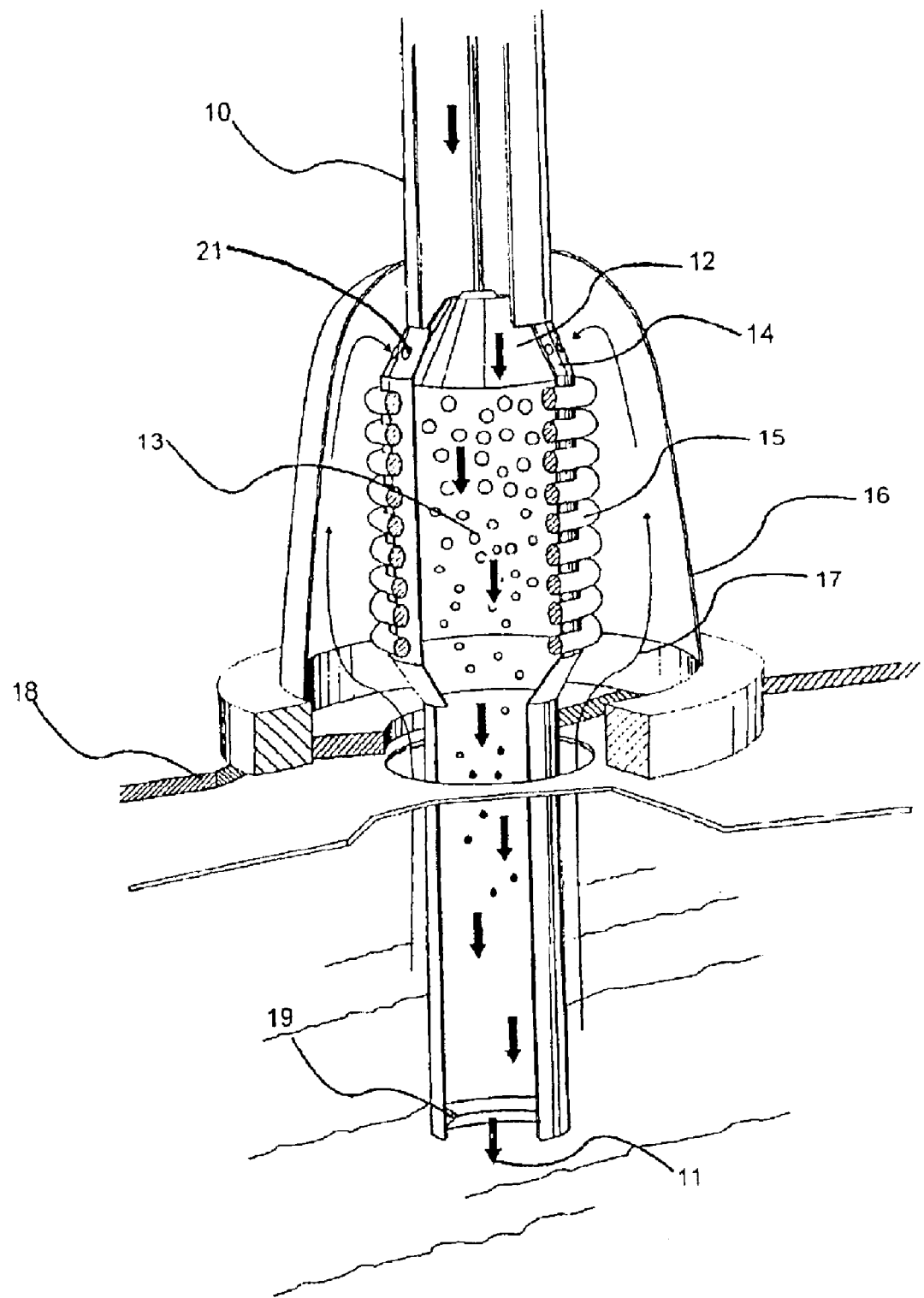
FIG. 1 is a perspective view in part section of the condensation apparatus according to the present invention.
Figure 2:
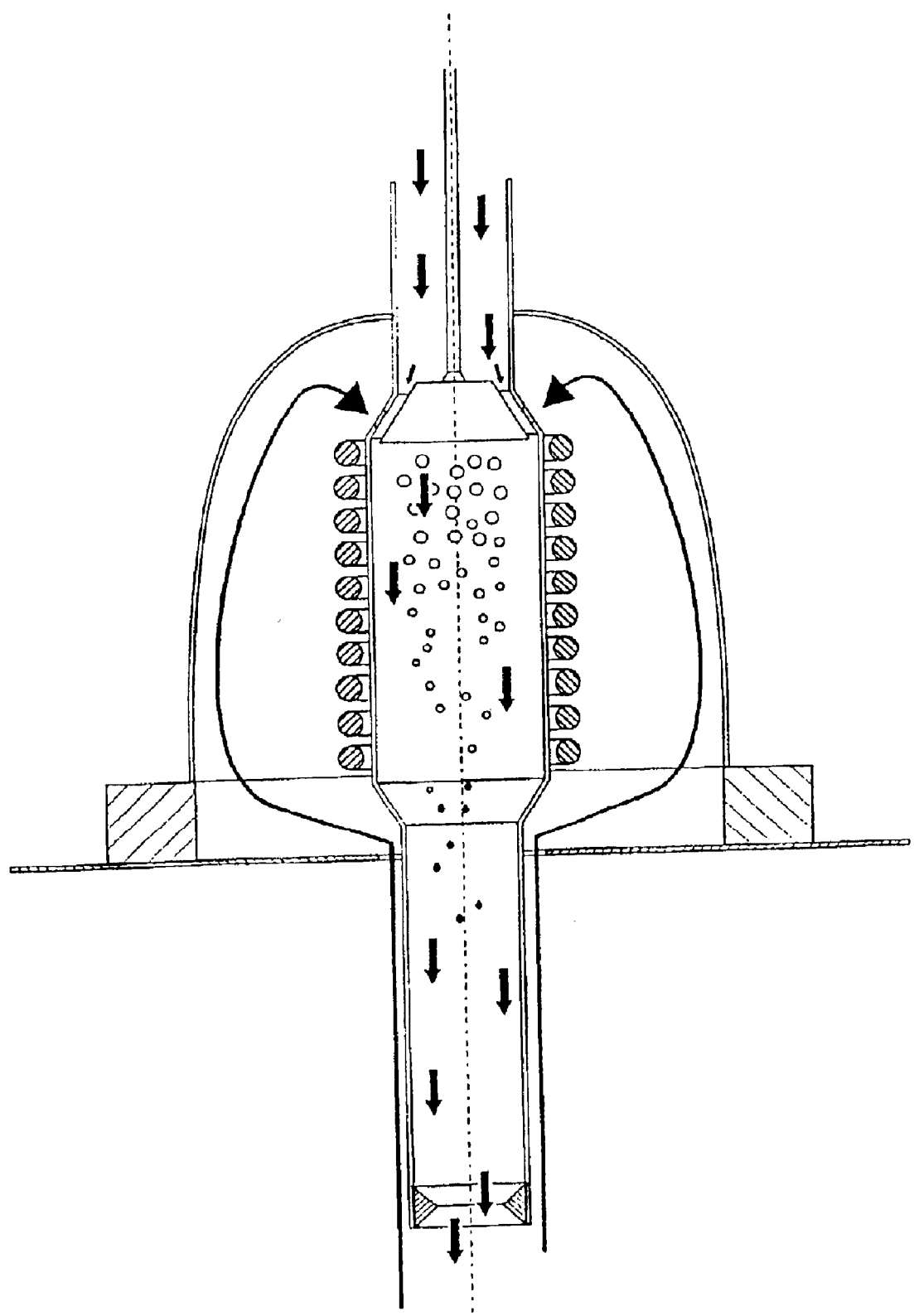
FIG. 2 is a side sectional view of the condensation apparatus of FIG. 1.

FIGS. 1 and 2 show a condensation apparatus according to the invention. The apparatus is connected to a tube or pipeline 10 for the filling of liquid. A conical piston 12 is attached to the end of the tube or pipeline. The purpose of this is to make a narrow cross section with high liquid velocity in the intersection between the tube 10 and the conical intersection 14 in the tube. The increase in velocity of the liquid flow creates a reduction of pressure. With the correct calibration, this pressure reduction is sufficient to draw the surrounding gas through small port 21 in the conical intersection 14. The support of the conical piston 12 is made such that the cross sectional area can be adjusted depending on the liquid flow rate, to achieve the desired under pressure compared to the ambient conditions. In a chamber 13, after the conical expansion, of the tube 10, with a venturi suction of gas/vapor, a reduced velocity results in an increase of pressure such that the gas bubbles created when the gas was sucked into the liquid, can condense if the termodyanamic parameters are correct. The potential for the condensation is governed by thermodynamic equilibrium. The condensation efficiency is dependent on bubble size and turbulence intensity. Small bubbles and much turbulence increase the condensation speed. The tube in the conical transition 14 is expanded between the tube or pipeline, and the condensation apparatus.

A ring of small ports 21, that the surrounding gas is sucked through, is placed at this conical transition. In cases where the thermodynamic equilibrium indicates that the potential for bubble condensation is not sufficient, this potential can be increased. Cooling the gas with a cooling element 15 can increase this potential. The location of the cooling element may be as shown in the figure, or inside the bubble chamber 13 such that it gets optimum contact with the gas bubbles. A third, more energy-consuming alternative, is cooling of the liquid flow.

To suck vapor that is displaced from the tank when filling into the condensation apparatus, it is equipped with a "gas hood" 16 that forms a chamber that is as sealed as possible between the filler opening in the tank and the ports 21 in the conical cross section where the gas is sucked into the bubble chamber. Inside the gas hood 16, a room 17 leads displaced vapor installed in the top of the tank or on the deck 6 of a ship 18. The restriction 19 increases the pressure in those cases where it can increase the potential for condensation in the fluid flow 11.

Figure 3:
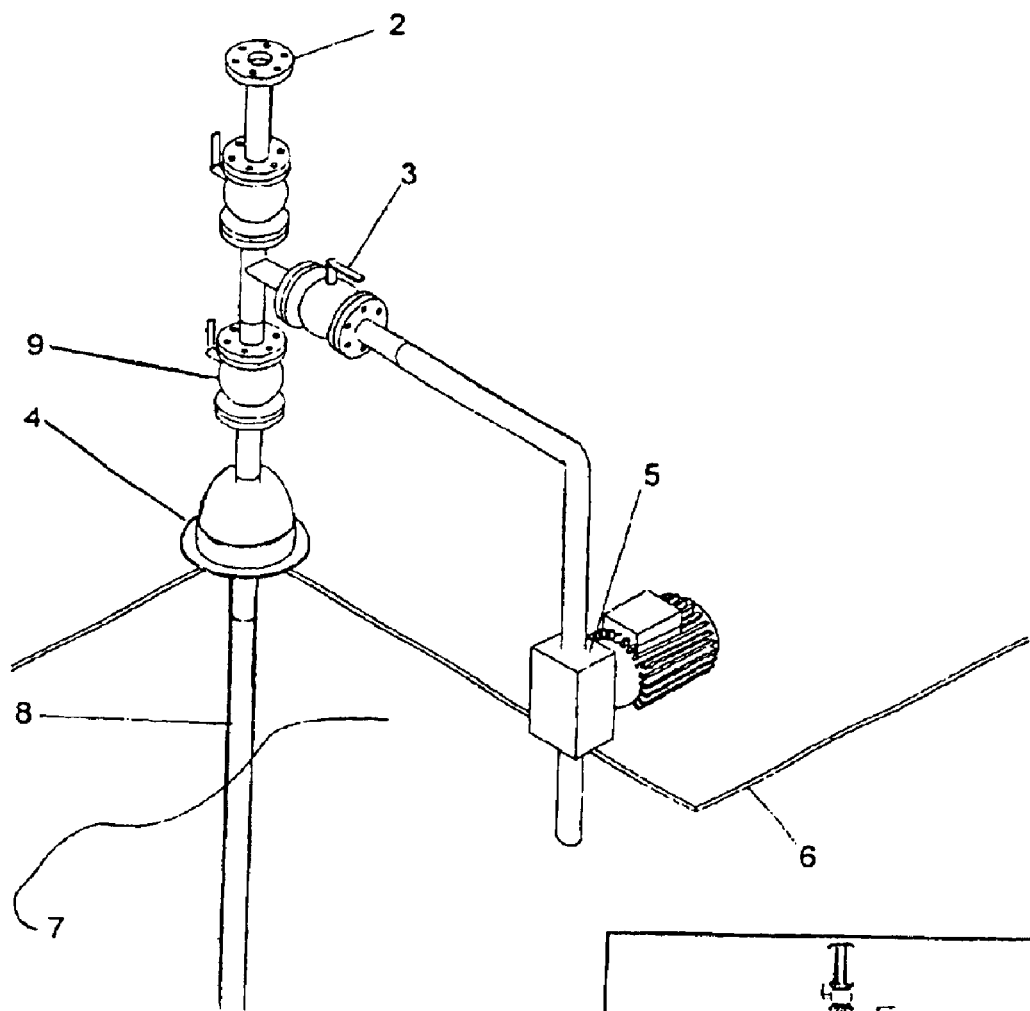
FIG. 3 is a perspective view of a system according to the present invention.
Figure 4:
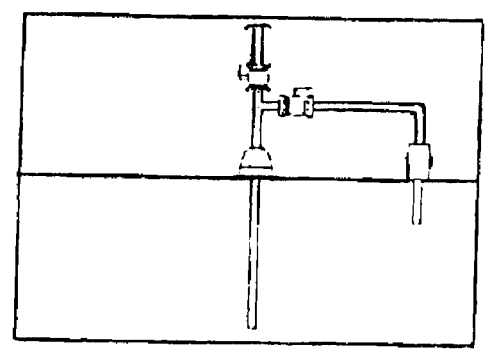
FIG. 4 is a side elevational view of the system on FIG. 3.
Figure 5:
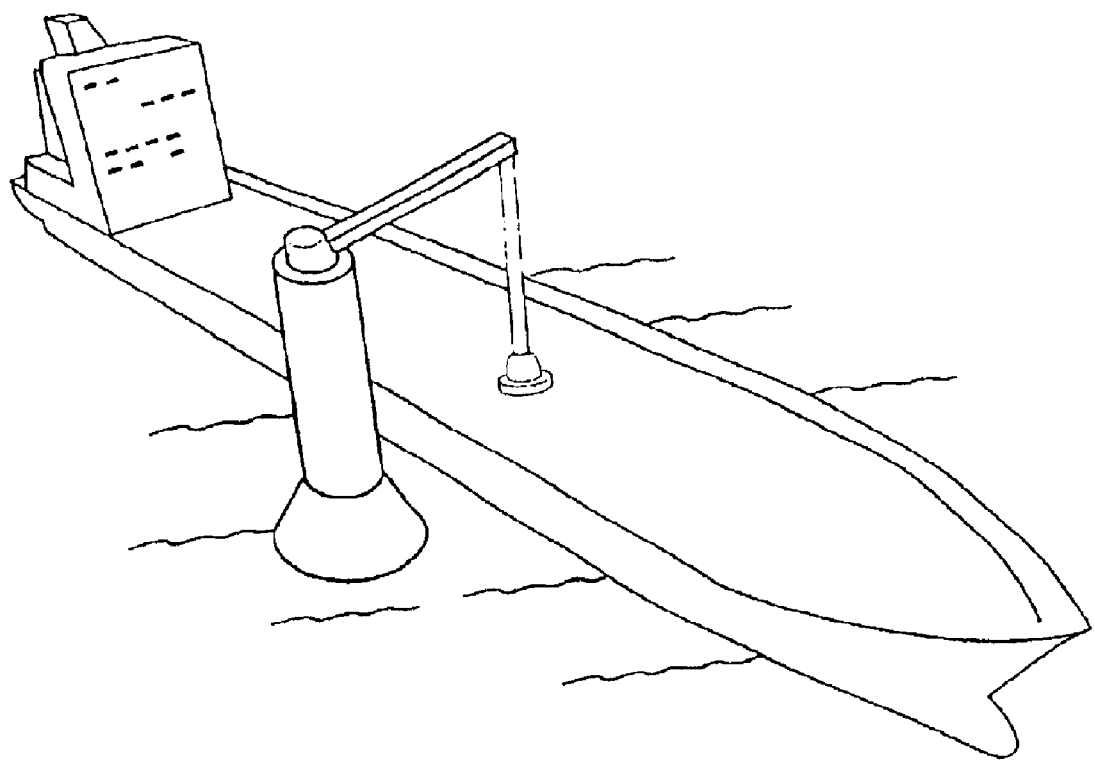
FIG. 5 shows a tanker being filled with liquid, with the apparatus in use.

FIGS. 3 and 4 show a system where the condensation apparatus on FIGS. 1 and 2 is used. The system is intended for use during storage and transport, and is run by letting oil being circulated in a loop with suction from the top of the surface of the oil, through the condensation apparatus, and down through a long tube to the bottom of the tank. The oil may be collected at the top by the oil surface, and is filled to the bottom of the tank. The bottom of the tank has a greater pressure (hydrostatic) that allows a greater amount of volatile fractions to be at equilibrium as a liquid.

The flange 2 is connected to a conductor when filling or emptying. The valve 3 is opened when emptying and circulating in the loop for the condensation of oil vapor through the condensation apparatus 4. A Pump 5 circulates the oil during transport, and may be used for filling the oil tank 7. The condensation apparatus 4 may be placed on the ship deck or on the oil tank 7. A pipe 8 leads the oil to the bottom of the tank 7. A valve 9 closes between the t-pipe and the condensation apparatus during filling.

What is claimed is:

1. A method for condensing fumes or gases from a tank containing a liquid, the method comprising:
   leading the liquid into a venturi to create an area of low pressure and high fluid velocity at the venturi, wherein the venturi includes a plurality of ports at the area of low pressure and high fluid velocity;
   leading gas/vapor to the ports in the venturi in the area of low pressure and high fluid velocity in such a way that the liquid entrains the gas/vapor and forms a fluid; and
   leading the fluid with the gas/vapor into a chamber such that the velocity of the fluid is reduced and the pressure increases to condense the gas/vapor.

2. The method according to claim 1, further comprising:
   shaping the venturi with a conical transition to create an expansion of a tube, placing a conical piston in the conical transition, wherein said conical transition terminates in the expanded tube to create the chamber.

3. The method according to claim 1, further comprising cooling the fluid with a cooling element.

4. The method according to claim 1, further comprising regulating the pressure over the venturi by means of a variable venturi.

5. The method according to claim 1, wherein the liquid comprises hydrocarbons.

6. The method according to claim 1, wherein the liquid comprises crude oil.

7. An apparatus for condensing vapors or gases coming from liquid stored in at least one tank during shipping or storing of the liquid in the tank, said apparatus comprising:

- a fluid conduit including an inlet section for receiving fluid to be stored in the tank, an intermediate section having an expanded diameter relative to said inlet section, a transition section between said inlet section and said intermediate section, and an outlet section extending from an end of said expanded intermediate section;
- a housing for collecting and leading gas/vapor to be condensed, said housing being sealingly connected to said inlet section and surrounding said expanded intermediate section so as to form a chamber; and
- a venturi formed in part by said transition section, wherein said transition section includes a plurality of inlet ports for permitting the flow of gas/vapor from the tank into the chamber so that the gas/vapor can be condensed at a higher pressure, and wherein the liquid and the condensed gas/vapor are transferred into the tank through the outlet section of the fluid conduit.

8. The apparatus according to claim 7, wherein the transition is conical so as to create a transition between said inlet section and said expanded intermediate portion, and the venturi comprises said conical transition section and a conical piston provided in the conical transition.

9. The apparatus according to claim 8, wherein the conical piston is adjustable in relation to the conical transition so as to provide a variable venturi for controlling the pressures over the venturi.

10. The apparatus according to claim 7, further comprising at least one cooling element for cooling part of the apparatus.

11. The apparatus according to claim 7, further comprising a plurality of cooling elements for cooling part of the apparatus.

12. The apparatus according to claim 7, wherein the outlet section comprises a restriction for creating a certain backpressure.

13. The apparatus according to claim 12, wherein the restriction is variable to control the backpressure in the outlet section.

14. The apparatus according to claim 7, further comprising a pump for circulating liquid from the tank through the housing and back into the tank.

15. A system for condensing gases created during storage of liquid, wherein the system comprises at least one tank for storing the liquid, a condensation device, and a pump for circulating fluid from the tank, through the condensation apparatus, and back into the tank, wherein the condensation device comprises:

- a fluid conduit including an inlet section for receiving fluid to be stored in the tank, an intermediate section having an expanded diameter relative to said inlet section, a transition section between said inlet section and said intermediate section, and an outlet section extending from an end of said expanded intermediate section;
- a housing for collecting and leading gas/vapor to be condensed, said housing being sealingly connected to said inlet section and surrounding said expanded intermediate section so as to form a chamber; and
- a venturi formed in part by said transition section, wherein said transition section includes a plurality of inlet ports for permitting the flow of gas/vapor from the tank into the chamber so that the gas/vapor can be condensed at a higher pressure, and wherein the liquid and the condensed gas/vapor are transferred into the tank through the outlet section of the fluid conduit.

16. The system according to claim 15, wherein the liquid that is circulated can be pumped up to the surface of the liquid, and then led back to the bottom of the tank.

* * * * *